(12) United States Patent
Mukai et al.

(10) Patent No.: US 6,306,321 B1
(45) Date of Patent: *Oct. 23, 2001

(54) METHOD FOR PRODUCING ARTIFICIAL MARBLE HAVING STRIPE PATTERNS

(75) Inventors: Nobuhiro Mukai; Masaaki Shibazaki; Kaori Fujita, all of Toyama; Masayuki Kamite; Konomi Hasumi, both of Tokyo, all of (JP)

(73) Assignees: Du Pont-MRC Co., Ltd.; Misawa Homes Co., Ltd., both of Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/424,589

(22) PCT Filed: May 11, 1998

(86) PCT No.: PCT/JP98/02070

§ 371 Date: Nov. 24, 1999

§ 102(e) Date: Nov. 24, 1999

(87) PCT Pub. No.: WO98/53973

PCT Pub. Date: Dec. 3, 1998

(30) Foreign Application Priority Data

May 26, 1997 (JP) .................................................. 9-135522

(51) Int. Cl.[7] .................................................. B29C 41/22
(52) U.S. Cl. .............................................. 264/73; 264/245
(58) Field of Search ............................... 264/73, 74, 245; 427/280, 281

(56) References Cited

U.S. PATENT DOCUMENTS

| 3,832,264 | 8/1974 | Barnette . | |
|---|---|---|---|
| 5,055,324 | * 10/1991 | Stecker | 427/281 |
| 5,698,032 | * 12/1997 | Weis | 118/402 |
| 5,820,799 | * 10/1998 | Barnett | 264/73 |
| 5,837,175 | 11/1998 | Mukai et al. | 264/73 |

FOREIGN PATENT DOCUMENTS

| 279 214 | 5/1990 | (DE) . | |
|---|---|---|---|
| 0164847 | 12/1985 | (EP) . | |
| 0667249 | 8/1995 | (EP) . | |
| 0842750 | 5/1998 | (EP) . | |
| 57-087319 | * 5/1982 | (JP) | 264/73 |
| 57-87913 | * 6/1982 | (JP) | 264/73 |
| 61-76505 | 4/1986 | (JP) . | |
| 3-50240 | * 3/1991 | (JP) | 264/73 |
| 6-48798 | 2/1994 | (JP) . | |
| 7-88849 | 4/1995 | (JP) . | |
| 7-156298 | 6/1995 | (JP) . | |
| 7-196356 | 8/1995 | (JP) . | |
| 7-329039 | 12/1995 | (JP) . | |

* cited by examiner

Primary Examiner—Jan H. Silbaugh
Assistant Examiner—Suzanne E. McDowell
(74) Attorney, Agent, or Firm—Oblon, Spivak, McClelland, Maier & Neustadt, P.C.

(57) ABSTRACT

A method in which a liquid resin in which a coloring agent is dispersed non-uniformly is injected into a molding cell, one or more liquid resins having different colors are laminated to form one or more layers on the liquid resin in which a coloring agent is dispersed non-uniformly, a comb-like tool is allowed to move through the laminated liquid resins while allowing the teeth to contact the bottom surface of the molding cell, and then, liquid resins are cured to produce artificial marble having stripe pattern. Artificial marble having a radial cut moire pattern with a delicate hue of wood and a natural appearance, or a stripe pattern having a natural marble-like appearance excellent in texture and deep feeling can be formed in a simple manner.

8 Claims, 3 Drawing Sheets

METHOD FOR PRODUCING ARTIFICIAL MARBLE HAVING STRIPE PATTERNS

BACKGROUND OF THE INVENTION

TECHNICAL FIELD

The present invention relates to a method for producing artificial marble having a stripe pattern.

BACKGROUND ART

Conventionally, artificial marble used in counters of wash stands, table tops and the like has been produced by curing a liquid resin. As a method for producing such artificial marble carrying patterns on the surface, Japanese Patent Application Publication (JP-B) No. 59-1568 and Japanese Patent Application Laid-Open (JP-A) No. 1-317723 discloses a method in which a synthetic resin material of different color is mixed by injecting a liquid resin into a molding cell.

However, according to these conventional methods, there are problems that reproducibility of pattern manifestation is deficient, and production yield for obtaining an excellent product is low. Further, when the product is used as artificial marble, the surface thereof is often shaved and therefore keeping of the surface pattern is required in this process. However, in many cases, the pattern disappears or changes significantly by shaving. Moreover, when an extraneous material is used for manifestation of a pattern, a difference in curing speed tends to occur and a difference in physical properties between materials tends to occur, consequently, the mechanical properties of the artificial marble may sometimes decrease as compared with that having no pattern.

The present inventors have suggested, as a method for solving the above-described problems, a method in which liquid resins having different colors are laminated in a molding cell, and comb-like tools are allowed to move in the molding cell before the resins are cured to produce artificial marble in U.S. Pat. No. 5,837,175. According to this method, a stripe pattern having a clear appearance can be simply formed and control of this pattern is easy, and further, a pattern can be formed continuously also along with thickness direction.

However, visual feeling is flat and a simple pattern is liable to be formed according to this method, therefore, the resulting artificial marble is not fully satisfactory from the standpoint of appearance as compared with natural woody materials and other natural marble. Particularly, there is room for improvement in view of the delicate hue, depth, texture and a luxury feeling owned by natural substances such as natural wood, natural stone and the like.

SUMMARY OF THE INVENTION

An object of the present invention is to provide a method for producing artificial marble in which a radial cut moire pattern having a delicate hue of wood and natural appearance, or a stripe pattern having a natural marble-like appearance excellent in texture and deep feeling can be formed and control of this pattern is easy.

Another object of the present invention is to provide a method for producing artificial marble which has a stripe pattern which can be formed continuously along the thickness direction and does not disappear even if surface is shaved.

Namely, the present invention provides a method for producing artificial marble having a stripe pattern by curing liquid resins in a molding cell, comprising injecting a liquid resin in which a coloring agent is dispersed non-uniformly into a molding cell, laminating one or more liquid resins having different colors to form one or more layers on the liquid resin in which a coloring agent is dispersed non-uniformly, and moving a comb-like tool through the laminated liquid resins while allowing the teeth to contact the bottom surface of the molding cell.

BEST MODES FOR CARRYING OUT THE PRESENT INVENTION

Figure 1:
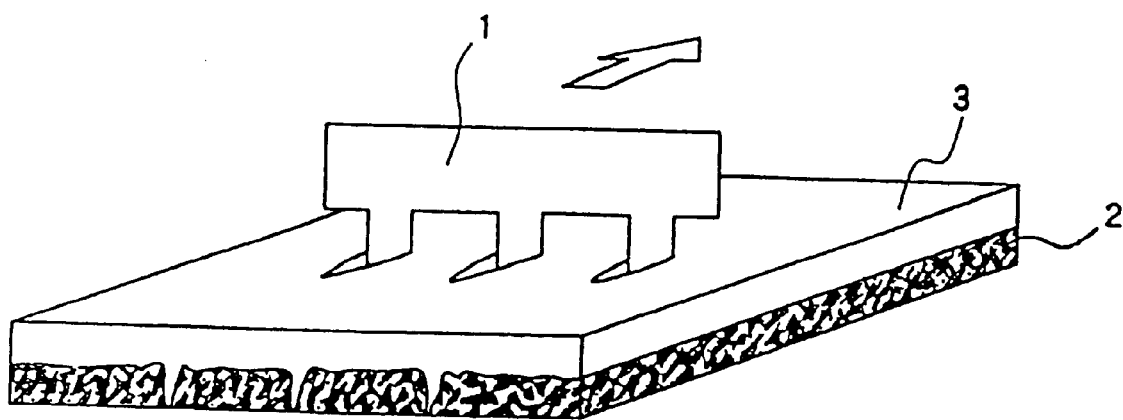
FIG. 1 is a schematic view illustrating a production method of the present invention.

In a method of the present invention, several kinds of liquid resins which are raw materials of artificial marble are injected into a molding cell, and a liquid resin which is first injected and constitutes the lowest layer in the cell is one revealing base tone at a significant surface of a product. In the present method, as this liquid resin injected first, a liquid resin in which a coloring agent is dispersed non-uniformly is used. The term liquid resin in which a coloring agent is dispersed non-uniformly in the present invention (hereinafter, referred to as "non-uniformly dispersed resin liquid") means both a resin wherein one coloring agent is dispersed in a liquid resin and there is unevenness in coloring concentration of a liquid resin due to non-uniform dispersion thereof, and a resin in which two or more coloring agents are dispersed in a liquid resin and there is unevenness also in a hue of a liquid resin due to non-uniform dispersion of these coloring agents, and a resin including both of them.

Such non-uniformly dispersed resin liquid can be prepared by the following methods.

In one method, two or more liquid resins having different colors are mixed, and mixed insufficiently. More specifically, for example, two or more liquid resins having different colors in which at least either coloring concentrations or hues are different are prepared, these are simultaneously injected into a mixing vessel, then, they are stirred by a stirring rod gently for a short period of time from about 10 to 30 seconds. As an alternative method, there is a method in which a coloring agent is added into a liquid resin, and the mixture is stirred insufficiently. More specifically, a colored or uncolored liquid resin is prepared, a coloring agent is added as is or is diluted with a suitable diluting agent before the addition to this resin in a relatively short period of time while stirring with a stirring rod, and the stirring is terminated immediately after or a short period of time after completion of the addition.

Degree of non-uniform dispersion of a coloring agent can be varied depending on appearance required for each product, provided that non-uniform dispersion of a coloring agent in a liquid resin can be confirmed at least visually. When such non-uniformly dispersed resin liquid is used, commonness of visual feeling disappears from the resulting artificial marble and one having an extremely improved grade and a natural appearance is obtained.

Injection of a non-uniformly dispersed resin liquid into a molding cell can be conducted by various methods, and it is preferable to conduct the injection so that a constant flow direction is imparted to the resin flow pattern revealed by this non-uniformly dispersed resin liquid on a significant surface of a product. Specifically, injection is conducted while moving a feeding vessel of a non-uniformly dispersed resin liquid along one direction relative to a molding cell. When the width of a molding cell is wide, this relative movement can be repeated several times.

For imparting a flow direction to a resin flow pattern, it is also possible that a non-uniformly dispersed resin liquid is injected into a molding cell without any special operation, then, operation to comb the injected non-uniformly dispersed resin liquid along one direction is repeated several times. Herein, so much repetition of this operation is unsuitable because the dispersion of a coloring agent in a liquid resin becomes uniform.

It is suitable that the flow direction of a resin flow pattern coincides with the moving direction of a comb-like tool described later, and by this, one having a delicate hue, deepness and texture of natural substances such as natural wood, natural marble and the like and an appearance generating a luxurious feeling can be obtained.

After a non-uniformly dispersed resin liquid constituting the lowest layer is thus injected into a molding cell, a liquid resin having different color is laminated to form a layer. In this lamination, a liquid resin of the upper layer may advantageously be injected so that the interface with a non-uniformly dispersed resin liquid of the lower layer is not disturbed so much, and there is no need to inject the resin while taking care of impartment of a direction to a resin flow pattern as in the case of a liquid resin of the lower layer. In the present method, at least two kinds of liquid resins having different colors are used. Therefore, three or more liquid resins having different colors may be laminated to form three or more layers. Liquid resins having different colors referred to in the present invention means liquid resins having different tones, namely liquid resins in which at least either coloring concentrations or hues are different.

If a non-uniformly dispersed resin liquid is used also as a liquid resin laminated as the upper layer, when this appears on a significant surface by moving operation of a comb-like tool described later, change in tone appears also in this portion. Therefore, such use of a non-uniformly dispersed resin liquid is preferable for obtaining artificial marble having a natural appearance. Herein, a liquid resin of the upper resin provides low ratio of area appearing on a significant surface, therefore, a liquid resin in which a coloring agent is dispersed uniformly may be used.

It is preferable that liquid resins are laminated in uniform condition at entire surface in a molding cell for controlling manifestation of pattern, however, partial unevenness in laminated thickness does not exert an influence directly on manifestation of stripe pattern. The thickness of liquid resin lamination is not particularly restricted, and it is preferable that the thickness of each layer is from 2 to 20 mm. Particularly, too large thickness of a lower layer liquid resin is not preferable because an upper layer liquid resin gets difficulty in reaching the bottom surface of a molding cell. On the other hand, too small thickness of a lower layer liquid resin is not preferable because the pattern tends to go out of order and control thereof is difficult, and problems regarding use also occur such as restriction of shaving thickness of the resultant product, and the like.

Liquid resins used in the present invention are usually in mixed state, and composition thereof is not particularly restricted. As typical examples thereof, there is exemplified a composition prepared by adding a filler, a coloring pigment and a curing catalyst to a syrup which is a mixture of a monomer such as methacrylate and the like with a polymer thereof. Examples of the filler include inorganic fillers such as aluminum hydroxide, magnesium hydroxide, calcium hydroxide and the like, and organic fillers such as a wood flour and the like. Examples of the coloring agent include titanium oxide, zinc sulfide revealing white color; iron oxide yellow revealing yellow color; iron oxide black revealing black color; iron oxide red revealing red color; ultramarine blue, phthalocyanine blue revealing blue color, and the like. Examples of the curing catalyst include tertiary butyl peroxymaleic acid, benzoyl peroxide, cumene hydroperoxide, tertiary butyl hydroperoxide, lauroyl peroxide, azobisisobutyronitrile and the like. In addition to these components, there can be added various components conventionally known as addition components for artificial marble, for example, dyes, ultraviolet absorbers, flame retardants, releasing agents, fluidizing agents, thickening agents, polymerization inhibitors, antioxidants and the like.

Regarding a liquid resin used, the viscosity of the liquid resin exerts particularly large influence on the method of the present invention. The viscosity of a liquid resin is preferably from 300 to 5000 cp. When the viscosity is too high or too low, control of non-uniform dispersibility of a coloring agent and manifestation of stripe pattern tends to become difficult. Further, by selecting appropriately the viscosity of a liquid resin, precipitation of an additive such as filler, coloring agent and the like can be prevented.

In the present invention, a comb-like tool is used and allowed to move through liquid resins thus injected into a molding cell to form layers while the leading end of the teeth is allowed to contact the bottom surface of the molding cell, so that the tool combs the laminated liquid resins. When the comb-like tools are allowed to move through liquid resins, expressed exaggeratedly, a concaveness from which a liquid resin is pushed away is formed in the track of the comb-like tool, and an upper layer liquid resin having different color flows in the concaveness. Therefore, an upper layer liquid resin having different color invades the bottom surface of a molding cell in the track of the teeth of the comb-like tool, and when the bottom surface is a significant surface, a stripe pattern shall be formed in the track of the teeth of the comb-like tool. FIG. 1 shows this condition schematically.

In the method of the present invention, it is necessary that an upper layer liquid resin 2 flows into the track of the teeth of the comb-like tool, and if only a lower layer liquid resin 3 flows into that area, a stripe pattern is not formed. Therefore, it is necessary that a concaveness is formed in the track of the teeth. Since various factors such as the viscosity of a liquid resin, the moving speed of a comb-like tool 1, the form of a comb-like tool 1 and the like are related mutually, conditions for successful occurrence of this concaveness cannot be determined commonly.

The moving speed of the teeth of a comb-like tool is important in relation to the viscosity of a liquid resin. When the moving speed of the teeth is too slow, a concaveness is not formed in the track of the teeth, therefore, a liquid resin having different color in the upper layer can not reach the bottom surface of a molding cell and a stripe pattern can not be formed. The moving speed of a comb-like tool is preferably from 1 to 10 cm/s in general. Though it is general to move a comb-like tool straight to form a straight stripe pattern, a comb-like tool can be moved in a snaked way to form a snaked stripe pattern. A comb-like tool can be moved several times. When moved several times, fluctuation in stripe pattern and change in interval occur, and an artificial marble having a natural appearance is obtained. That is, movement several times is a preferable embodiment for the method of the present invention.

It is suitable that a comb-like tool used in the present invention is made of a material which is inactive against liquid resins and exhibits no adhesion, and examples of this material include metals such as aluminum and the like, organic materials coated with polytetrafluoroethylene, and the like.

Figure 2:
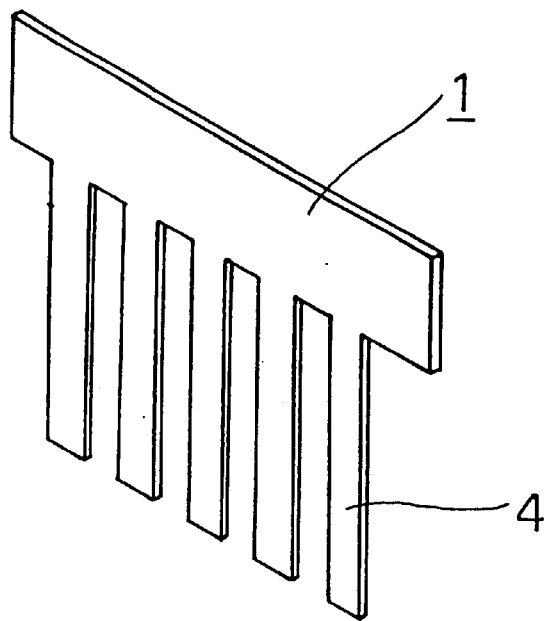
FIGS. 2 is a view showing an example of a comb-like tool used in a production method of the present invention.

FIG. 2 is a schematic view of a comb-like tool 1 used in the method of the present invention. Regarding the form of a tooth 4 of a comb-like tool, it is suitable that the length of the tooth 4 is fully longer than the thickness of laminated liquid resins so as not to cause unnecessary disturbance in an upper layer liquid resin. The width of a tooth (length vertical to moving direction of teeth) is preferably from 1 to 20 mm. The width of a tooth exerts an influence on the width of the stripe formed though it does not coincide with the width of the stripe formed. The thickness of tooth (length along the moving direction of the teeth) may advantageously be a thickness at which mechanical strength of the teeth is kept, and does not exert an influence on formation of a stripe pattern so much. Regarding sectional form of a tooth, a streamline form is not suitable, and a rectangle form is suitable such that turbulence occurs in a liquid resin in the track of teeth. The form of the leading end of the teeth preferably has a flat surface so as to enable close contact with the bottom surface of a molding cell. The number of teeth may be one provided that a multi-time movement is not troublesome, and a suitable number of teeth and the interval between teeth can be selected depending on the stripe pattern desired.

After a comb-like tool is thus allowed to move, a liquid resin is cured according to an ordinary method, a cured product is taken out from a molding cell after curing to obtain artificial marble. The resulting artificial marble has a stripe pattern formed on the contact surface with the bottom surface of a molding cell. The thus formed stripe pattern is constituted of lines having a fluctuation unlike lines drawn with a ruler, because this stripe pattern is made based on the flow mixing of liquid resins having different colors. Further, artificial marble having a radial cut-like moire pattern can also be produced when the tone of a liquid resin and the number of teeth of a comb-like tool and the moving times are suitably selected.

Practice of the method of the present invention in a batch-wise casting method has been illustrated above, however, in a continuous casting method, a stainless belt moving as a molding cell and frames for damming liquid resins made of rubber, resin and the like placed on both sides of the stainless belt are used. Therefore, it is also permissible that a comb-like tool is allowed to stand still and fixed, and a comb-like tool moves relatively in a liquid resin.

Artificial marble produced by the present invention can be applied to use such as kitchen top plates, washing dressing tables, bathtubs, tables, wall materials, furniture, interior goods and the like in houses.

The present invention will be illustrated more specifically using examples. In the examples, "%" and "parts" indicate "% by weight" and "parts by weight", respectively.

EXAMPLE 1

One thousand parts of a methyl methacrylate syrup (hereinafter, abbreviated as syrup) composed of a mixture of 20% of polymethyl methacrylate and 80% of methyl methacrylate, 800 parts of an aluminum hydroxide powder (BS-33, trade name, manufactured by Nippon Light Metal Co., Ltd.), 12 parts of ethylene glycol dimethacrylate, 20 parts of tertiary butyl peroxymaleic acid, 2 parts of deionized water and 200 parts of a wood powder (Misawa Techno Powder T3-B1403-03, trade name, manufactured by Misawa Techno Material K.K.) were mixed, and stirred by a mixer to obtain a mixed slurry. This mixed slurry was de-foamed in a vacuum vessel, then, 0.1 part of glycol dimercapto acetate and 8 parts of a slurry prepared by dispersing calcium hydroxide in an amount of 25% into a syrup were added to prepare a base mixture. The viscosity of this base mixture was 1000 cps.

Figure 3:
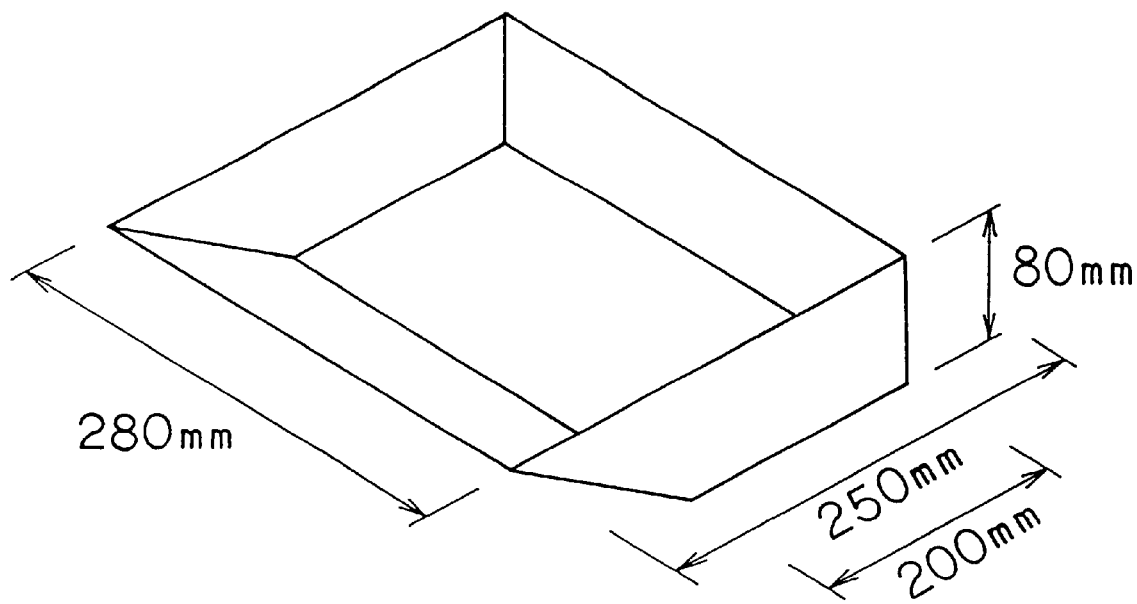
FIG. 3 is a view showing a pan-like vessel used in a production method of the present invention.
Figure 4:
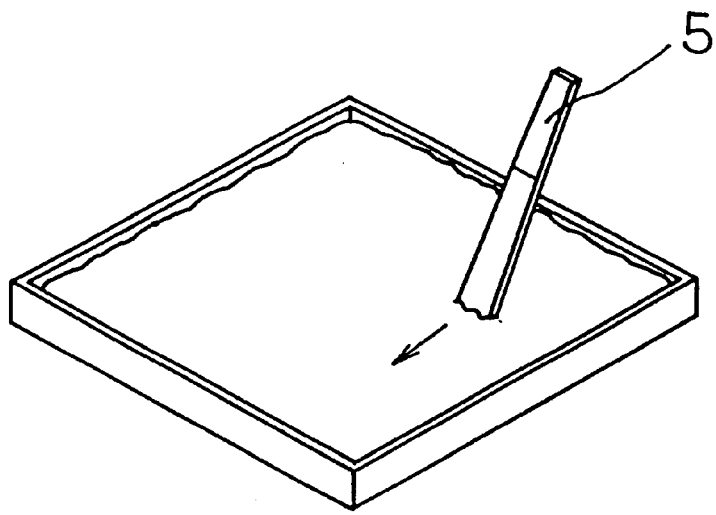
FIG. 4 is a view showing operation to impart direction to a liquid resin by a spatula.

Two-third of this base mixture was taken aside and this was further divided into three portions, and coloring agent compositions No. 1 to 3 described in Table 1 (unit is by weight) were added to the three portions, respectively, and each mixture was stirred to uniform condition. Then, the resulting three kinds of colored mixtures were transferred to a pan-like vessel shown in FIG. 3, and mixed moderately with a stirring rod having a thickness of 3 mm, a width of 25 mm and a length of 250 mm for 3 seconds so that they were not mixed completely to prepare an incomplete mixture. Then, this was injected into a mold in the form of a tray of 30 cm square while moving the mixture along one direction maintaining the injection speed along the width direction approximately constant, to obtain a thickness of 9 mm. Then, a spatula having the leading end of a width of 30 mm and a thickness of 1 mm was allowed to contact the bottom surface of the mold and move along the same direction with the moving direction in injection so that the spatula detrudes the incomplete mixture in the mold. The same detrusion operation was repeated further three times in which the spatula was moved along a parallel direction so as not to cause crossing, to impart a flow direction to a flow pattern of the incomplete mixture.

On the other hand, a coloring agent composition No. 4 was added to the remaining base mixture and mixed uniformly, then, this was transferred to the pan-like vessel, and mixed moderately with a stirring rod 5 for 10 seconds so that they were not mixed completely while adding a coloring agent composition No. 5, to prepare another incomplete mixture. This mixture was injected onto the incomplete mixture in the mold to laminate an incomplete mixture layer having a thickness of 4.5 mm in the same manner as described above.

A comb-like tool having a form shown in FIG. 2 made of a polytetrafluoroethylene plate having a thickness of 3 mm in which a width of a tooth is 5 mm and the interval of teeth is 25 mm was immersed in one end of the mold, and was allowed to move at a speed of 50 mm/s toward other end of the mold through the laminated mixture while allowing the teeth contact the bottom surface of the mold, along the same moving direction as in injection. Then, this mold was covered with a cap and left for 30 minutes while heating to cure the resins, then, a cured article was taken out from the mold, to obtain artificial marble in which a moire pattern was manifested on the contact surface with the bottom surface of the mold.

Regarding the appearance of the resulted artificial marble, it had a moire pattern like natural wood, and even if the surface thereof was shaved about 0.5 mm, the basic stripe pattern did not change, the gloss decreased, and a surface roughness feeling increased, leading to improvement in woody feeling.

TABLE 1

| No. | Iron Oxide Yellow 50-580-570 manufactured by RBH | Iron Oxide Red 50-580-556 manufactured by RBH | Iron Oxide Black 50-580-554 manufactured by RBH | Phthalo Green 50-580-585 manufactured by RBH | Titanium Oxide 50-580-548 manufactured by RBH | Syrup |
| --- | --- | --- | --- | --- | --- | --- |
| 1 | 1.930 | 0.210 | 0.130 | 0 | 0 | 2.270 |
| 2 | 1.600 | 0.220 | 0.010 | 0 | 0 | 1.930 |
| 3 | 2.330 | 0.350 | 0.180 | 0 | 0 | 2.870 |
| 4 | 3.760 | 0.540 | 0.260 | 0 | 0 | 4.560 |
| 5 | 0.940 | 0.130 | 0.070 | 0 | 0 | 1.140 |
| 6 | 0.030 | 0 | 0.018 | 0.005 | 0 | 5.291 |
| 7 | 0.134 | 0 | 0 | 0 | 0 | 13.227 |
| 8 | 0 | 0 | 0 | 0 | 8.907 | 20.783 |

EXAMPLE 2

A base mixture was prepared in the same manner as in Example 1 except that the amount of aluminum hydroxide was changed to 1630 parts, the amount of the wood powder was changed to 0 part in the base mixture composition of Example 1. Two-third thereo was divided and a coloring agent composition No. 6 was added and the mixture was stirred until it was uniform. Then, it was transferred to a pan-like vessel, and mixed moderately with a stirring rod for 10 seconds so that it was not mixed completely while adding a coloring agent composition No. 7, to prepare an incomplete mixture. This mixture was injected in the mold in the same manner as in Example 1, and a flow direction was imparted to resin flow pattern by a spatula.

The remaining part of the base mixture was transferred to a pan-like vessel, and mixed moderately with a stirring rod for 10 seconds so that it was not mixed completely while adding a coloring agent composition No. 6, to prepare an incomplete mixture. This mixture was laminated on the incomplete mixture in the mold in the same manner as in Example 1.

Subsequently, the comb-like tool w as moved in the same manner as in Example 1, then, cured to obtain artificial marble. The appearance of the resultant artificial marble had a delicate hue, deepness and texture of marble, and was extremely close to that of such kind of marble as revealing a flow pattern. Even if the surface was shaved about 0.5 mm, no basic pattern change was observed.

EXAMPLE 3

Figure 5:
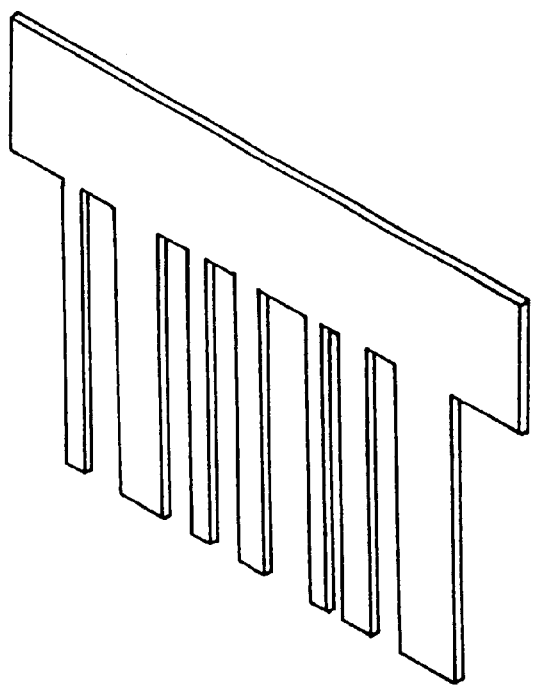
FIGS. 5 is a view showing another example of a comb-like tool used in a production method of the present invention.

Artificial marble was produced in the same manner as in Example 1, except that a comb-like tool as shown in FIG. 5 in which the width of a tooth changes irregularly from 2 to 12 mm and the interval of teeth changes irregularly from 2 to 10 mm was used, and this was allowed to move once in a mold, then, was shifted 10 mm along the vertical direction (transverse direction) to the moving direction, and moved again in the mold in the same manner.

A moire of the resultant artificial marble had a stripe interval narrower than that in Example 1, an irregularly changed distance between moire patterns and delicate fluctuation, therefore, it had extremely high natural feeling.

INDUSTRIAL APPLICABILITY

According to the production method of the present invention, artificial marble having a radial cut moire pattern having a delicate hue of wood and a natural appearance, or a stripe pattern having natural marble-like appearance excellent in texture and deep feeling can be formed in a simple manner. Since this stripe pattern is formed continuously also in thickness direction of artificial marble, even if the surface of the artificial marble is shaved, the pattern does not disappear, and the continuous stripe pattern can be manifested also on the shaved part. Also, control of the width of stripe pattern and running direction thereof can be regulated by controlling form and moving direction and the like of teeth of a comb-like tool. Further, the base part and the stripe pattern part of artificial marble have approximately the same composition, there is no decrease in mechanical property of artificial marble by provision of a handle.

What is claimed is:

1. A method for producing artificial marble having a stripe pattern by curing liquid resins in a molding cell, comprising injecting a liquid resin in which a coloring agent is dispersed non-uniformly into a molding cell, laminating one or more liquid resins having different colors to form one or more layers on the liquid resin in which a coloring agent is dispersed non-uniformly, and moving a comb-like tool through the laminated liquid resins while allowing teeth of the tool to contact the bottom surface of the molding cell to produce a striped pattern formed from an upper layer liquid resin which flows to the bottom of the molding cell.

2. The production method according to claim 1 wherein two or more liquid resins having different colors are mixed, and mixed insufficiently to prepare a liquid resin in which a coloring agent is dispersed non-uniformly.

3. The production method according to claim 1 wherein a coloring agent is added into a liquid resin, and stirred insufficiently to prepare a liquid resin in which a coloring agent is dispersed non-uniformly.

4. The production method according to claim 1 wherein a constant flow is imparted to a resin flow pattern of a liquid resin in which a coloring agent is dispersed non-uniformly and injected into a molding cell.

5. The production method according to claims 1 wherein a liquid resin having different color to be laminated on the liquid resin in which a coloring agent is dispersed non-uniformly is a liquid resin having a different color in which a coloring agent is dispersed non-uniformly.

6. The production method according to claim 1 wherein resin layers are laminated so that each thickness of the layer is from 2 to 20 mm.

7. The production method according to claim 1 wherein a liquid resin having a viscosity of 300 to 5000 cp is used.

8. The production method according to claim 1 wherein the comb-like tool is allowed to move relatively at a speed of 1 to 10 cm/s through liquid resins.

\* \* \* \* \*